United States Patent
Coyle (10) Patent No.: US 9,853,437 B2
(45) Date of Patent: Dec. 26, 2017

(54) LIQUID-TIGHT STRAIN RELIEF

(71) Applicant: HEYCO INC., Toms River, NJ (US)

(72) Inventor: William J. Coyle, Toms River, NJ (US)

(*) Notice: Subject to any disclaimer, the term of this patent is extended or adjusted under 35 U.S.C. 154(b) by 50 days.

(21) Appl. No.: 14/670,852

(22) Filed: Mar. 27, 2015

(65) Prior Publication Data
US 2015/0280413 A1   Oct. 1, 2015

Related U.S. Application Data

(60) Provisional application No. 61/971,604, filed on Mar. 28, 2014.

(51) Int. Cl.
| | |
|---|---|
| *F16J 15/04* | (2006.01) |
| *H02G 15/007* | (2006.01) |
| *H02G 3/22* | (2006.01) |
| *H02G 15/013* | (2006.01) |
| *H02G 3/06* | (2006.01) |

(52) U.S. Cl.
CPC ............ *H02G 15/007* (2013.01); *F16J 15/04* (2013.01); *H02G 3/065* (2013.01); *H02G 3/22* (2013.01); *H02G 15/013* (2013.01)

(58) Field of Classification Search
CPC ........ H02G 15/013; H02G 3/065; H02G 3/22; F16L 5/02
USPC ..... 285/3, 4, 140.1, 194, 202, 203, 214, 216
See application file for complete search history.

(56) References Cited

U.S. PATENT DOCUMENTS

| | | | |
|---|---|---|---|
| 682,847 | A | 9/1901 | Forsyth |
| 2,310,622 | A | 2/1943 | Ellinwood |
| 2,475,322 | A | 7/1949 | Horton |
| 2,528,533 | A | 11/1950 | McCulloch |

(Continued)

FOREIGN PATENT DOCUMENTS

| | | |
|---|---|---|
| AT | 309932 | 9/1973 |
| DE | 9011069 | 10/1990 |

(Continued)

OTHER PUBLICATIONS

International Search Report and Written Opinion dated Oct. 2, 2014 in regard to PCT Application No. PCT/US14/51004.

(Continued)

*Primary Examiner* — David Bochna
(74) *Attorney, Agent, or Firm* — Ryder, Lu, Mazzeo & Konieczny LLC; Joseph M. Konieczny, Sr.; Gregory J. Gore (57) ABSTRACT

A liquid-tight strain relief includes a tubular-shaped bushing and a dome-shaped gland. The bushing includes a flange, a centrally-located aperture, a plurality of resilient outer fingers, and a plurality of resilient inner fingers extending from an inner wall into the aperture. The gland includes a head having a centrally-located membrane. The head is co-molded with and encapsulates the flange, resulting in a strain relief having a unitary construction. The strain relief is adapted to be inserted within an orifice of a work piece, and the outer fingers frictionally engage the work piece. A cable is inserted within the strain relief by piercing the membrane, which stretches and provides a seal against the cable. The cable is inserted through the aperture of the bushing and the resilient inner fingers flex outwardly to enable the cable to pass through, while engaging and digging into the cable to clasp it and provide strain relief.

22 Claims, 10 Drawing Sheets

(56) References Cited

U.S. PATENT DOCUMENTS

| | | | |
|---|---|---|---|
| 2,664,458 A | 12/1953 | Rapata | |
| 2,967,722 A | 1/1961 | Lifka | |
| 2,974,186 A | 3/1961 | Klumpp, Jr. | |
| 3,144,695 A | 8/1964 | Budwig | |
| 3,262,721 A | 7/1966 | Knight | |
| 3,290,430 A | 12/1966 | Klumpp, Jr. | |
| 3,351,974 A * | 11/1967 | Wilhelmi | E05B 85/08 285/110 |
| 3,376,004 A | 4/1968 | Goldman | |
| 3,427,894 A * | 2/1969 | Tschanz | F16C 1/103 285/140.1 |
| 3,464,659 A | 9/1969 | Klumpp, Jr. | |
| 3,719,971 A | 3/1973 | Lodi | |
| 3,809,798 A | 5/1974 | Simon | |
| 3,953,665 A | 4/1976 | Nicholson | |
| 3,958,300 A | 5/1976 | Takaka | |
| 3,972,547 A | 8/1976 | Itoya | |
| 4,000,875 A | 1/1977 | Jemison | |
| 4,034,944 A | 7/1977 | Moran | |
| 4,137,602 A * | 2/1979 | Klumpp, Jr. | B65D 39/04 285/194 |
| 4,194,768 A | 3/1980 | Gretz | |
| 4,224,464 A | 9/1980 | Bunnell | |
| 4,225,162 A | 9/1980 | Dola | |
| 4,264,047 A | 4/1981 | Nelson | |
| 4,299,363 A * | 11/1981 | Datschefski | H02G 3/083 16/108 |
| 4,302,035 A | 11/1981 | Ochwat | |
| 4,323,727 A | 4/1982 | Berg | |
| 4,400,022 A | 8/1983 | Wright | |
| 4,432,520 A | 2/1984 | Simon | |
| 4,457,544 A | 7/1984 | Snow | |
| 4,474,489 A * | 10/1984 | Simon | H02G 3/083 16/2.5 |
| 4,478,381 A | 10/1984 | Pittion | |
| 4,487,386 A | 12/1984 | Hehl | |
| 4,490,576 A | 12/1984 | Bolante | |
| 4,494,779 A | 1/1985 | Neff | |
| 4,568,047 A | 2/1986 | Matsui | |
| 4,646,995 A | 3/1987 | Matsui | |
| 4,692,562 A | 9/1987 | Nattel | |
| 4,698,459 A | 10/1987 | Drake | |
| 4,708,370 A | 11/1987 | Todd | |
| 4,729,534 A | 3/1988 | Hill | |
| 4,739,126 A | 4/1988 | Gutter | |
| 4,746,023 A * | 5/1988 | Belter | F16L 5/10 123/198 E |
| 4,762,343 A * | 8/1988 | Hirohata | F16L 5/12 285/140.1 |
| 4,775,121 A | 10/1988 | Carty | |
| 4,835,342 A | 5/1989 | Guginsky | |
| 4,874,325 A | 10/1989 | Bensing | |
| 4,888,453 A | 12/1989 | Blasko | |
| 4,903,995 A | 2/1990 | Blenkush | |
| 4,913,385 A | 4/1990 | Law | |
| 4,981,310 A * | 1/1991 | Belisaire | F16B 21/086 285/140.1 |
| 5,072,072 A | 12/1991 | Bawa | |
| D324,488 S * | 3/1992 | Fujimoto | D8/356 |
| 5,098,310 A | 3/1992 | Avramovich | |
| 5,113,717 A | 5/1992 | Plamper | |
| 5,132,493 A | 7/1992 | Sheehan | |
| 5,200,575 A | 4/1993 | Sheehan | |
| 5,226,837 A | 7/1993 | Cinibulk | |
| 5,304,742 A | 4/1994 | Filbert | |
| 5,318,459 A | 6/1994 | Shields | |
| 5,321,205 A | 6/1994 | Bawa | |
| 5,346,264 A | 9/1994 | Law | |
| 5,388,866 A | 2/1995 | Schlosser | |
| 5,390,876 A | 2/1995 | Hatano | |
| 5,405,172 A | 4/1995 | Mullen, Jr. | |
| 5,494,245 A | 2/1996 | Suzuki | |
| 5,543,582 A | 8/1996 | Stark | |
| 5,563,378 A | 10/1996 | Uchida | |
| 5,653,411 A | 8/1997 | Picco | |
| 5,820,048 A | 10/1998 | Shereyk | |
| 5,872,335 A | 2/1999 | Mullen, Jr. | |
| 5,906,342 A | 5/1999 | Kraus | |
| 5,954,345 A * | 9/1999 | Svoboda | F16H 57/029 285/4 |
| 5,984,373 A | 11/1999 | Fitoussi | |
| 6,044,868 A | 4/2000 | Gretz | |
| 6,082,782 A * | 7/2000 | Bartholoma | F16L 25/0045 285/140.1 |
| 6,102,442 A | 8/2000 | Gretz | |
| 6,102,445 A | 8/2000 | Thomas | |
| 6,142,429 A | 11/2000 | Ahroni | |
| 6,164,604 A | 12/2000 | Cirino | |
| 6,231,085 B1 | 5/2001 | Olson | |
| 6,300,569 B1 | 10/2001 | Mullen, Jr. | |
| 6,311,935 B1 | 11/2001 | Mullen, Jr. | |
| 6,585,297 B2 | 7/2003 | Mullen, Jr. | |
| 7,240,700 B2 * | 7/2007 | Pangallo | B62D 25/24 285/140.1 |
| 7,325,838 B2 * | 2/2008 | Gardner | F16L 21/08 285/140.1 |
| 7,615,714 B2 * | 11/2009 | Pyron | H02G 3/085 174/660 |
| 8,739,363 B2 * | 6/2014 | Allen | A61B 50/20 16/2.1 |
| 2003/0062720 A1 * | 4/2003 | Anderson | F16L 37/008 285/140.1 |
| 2006/0219437 A1 | 10/2006 | Chiu | |
| 2008/0236861 A1 | 10/2008 | Bartholoma | |
| 2014/0028018 A1 * | 1/2014 | Weidman | F16L 37/12 285/140.1 |

FOREIGN PATENT DOCUMENTS

| | | |
|---|---|---|
| DE | 19544963 | 6/1997 |
| DE | 202007003295 U1 | 5/2007 |
| DE | 202006000932 U1 | 6/2007 |
| EP | 0151273 | 8/1988 |
| EP | 0151272 | 7/1989 |
| EP | 0283575 | 8/1992 |
| EP | 1746699 A2 | 1/2007 |
| EP | 1993179 A2 | 11/2008 |
| FR | 2528533 | 12/1983 |
| GB | 2219146 | 11/1989 |
| GB | 2258350 | 2/1993 |
| GB | 2400503 | 10/2004 |
| WO | 94/27079 | 11/1994 |
| WO | 1998036481 | 8/1998 |
| WO | 2001005011 | 9/2001 |
| WO | 2002025157 | 7/2002 |
| WO | 2005/081374 A1 | 9/2005 |

OTHER PUBLICATIONS

International Search Report and Written Opinion dated Jun. 19, 2015 in regard to PCT Application No. PCT/US2015/022962.

* cited by examiner

LIQUID-TIGHT STRAIN RELIEF

CROSS-REFERENCE TO RELATED APPLICATION

The present application is a Section 111(a) application relating to and claiming the benefit of commonly owned, U.S. Provisional Patent Application No. 61/971,604, having a filing date of Mar. 28, 2014, which is incorporated by reference herein in its entirety.

FIELD OF THE INVENTION

The present invention relates to a strain relief and, more particularly, to a liquid-tight, co-molded strain relief for cables, wires, tubing, rods and other elongated objects.

BACKGROUND OF THE INVENTION

Liquid-tight strain reliefs are affixed in a liquid-tight manner in orifices of work pieces. The liquid-tight strain reliefs enable cables, wires, tubing or rods to be passed through them in a locked and liquid tight engagement, while providing strain relief protection. Liquid-tight strain reliefs are described in U.S. Pat. Nos. 5,405,172 and 8,398,419, which are incorporated by reference herein in their entirety. Liquid-tight strain reliefs are also described in pending U.S. patent application Ser. No. 14/459,495, filed Aug. 14, 2014, published as U.S. Patent Application Publication No. 2015/0048614 on Feb. 19, 2015, which is incorporated herein by reference in its entirety.

SUMMARY OF THE INVENTION

A liquid-tight strain relief includes a tubular-shaped bushing and a dome-shaped gland co-molded with the bushing. The bushing includes a flange, a centrally-located aperture, a plurality of resilient outer fingers, and a plurality of resilient inner fingers extending from an inner wall and positioned within the aperture. The gland includes a head having a centrally-located membrane. The head of the gland is co-molded with and encapsulates the flange of the bushing, thereby resulting in a strain relief having a unitary construction. The strain relief is inserted within an orifice of a work piece, such as a panel, and the outer fingers frictionally engage the work piece. A cable is inserted within the strain relief by piercing the membrane, which stretches and provides a seal against the cable. The cable is inserted through the aperture of the bushing and the resilient inner fingers of the bushing flex outwardly to enable the cable to pass through, while engaging and digging into the cable to clasp it and provide strain relief.

DETAILED DESCRIPTION OF THE DRAWINGS

Referring to FIGS. 1 through 7, in an embodiment, a liquid-tight strain relief 10 includes a tubular-shaped bushing 12 and a dome-shaped gland 14 attached to the bushing 12. In an embodiment, the gland 14 is co-molded with the bushing 12 in a manner that will be described hereinafter. In an embodiment, the bushing 12 is made from a thermoplastic material, while the gland 14 is made from a thermoplastic elastomer (TPE). In other embodiments, the bushing 12 and the gland 14 may be made from other suitable materials known in the art.

Figure 1:
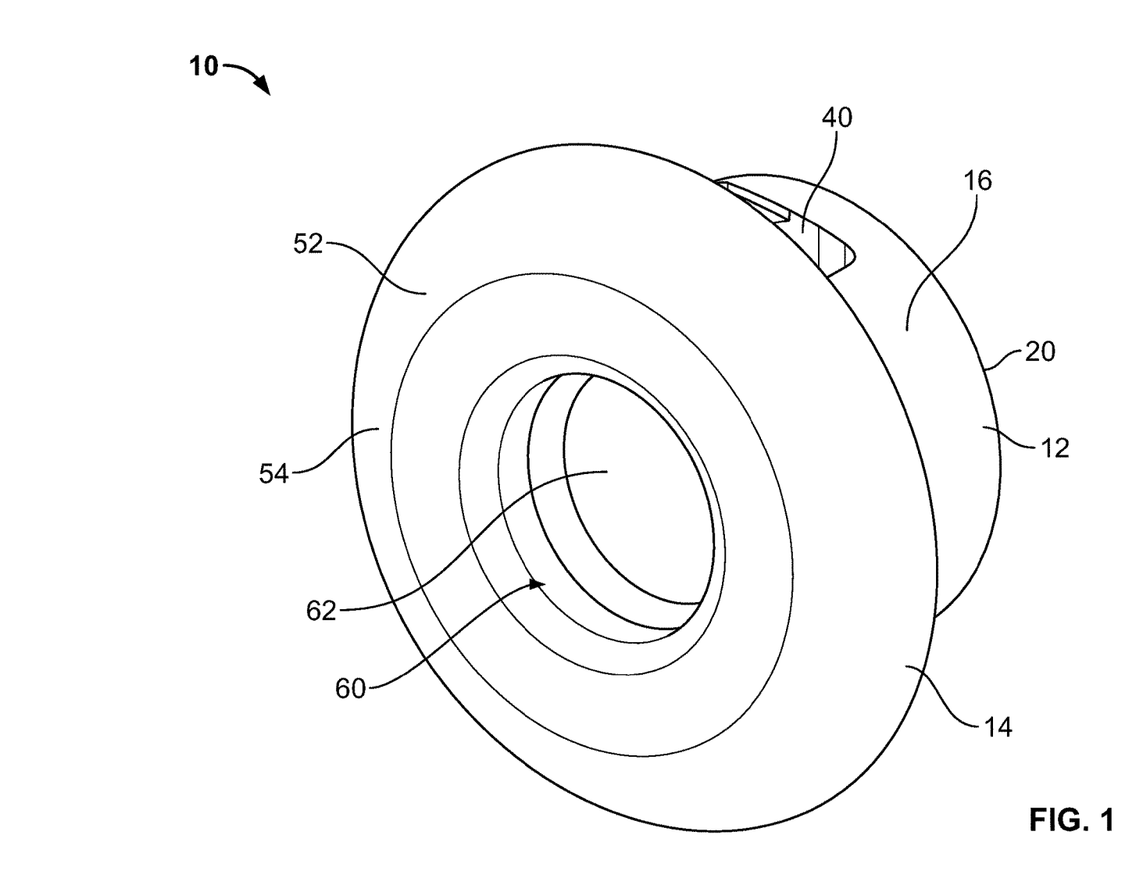
FIG. 1 is a top perspective view of a liquid-tight strain relief constructed in accordance with an embodiment of the invention.
Figure 2:
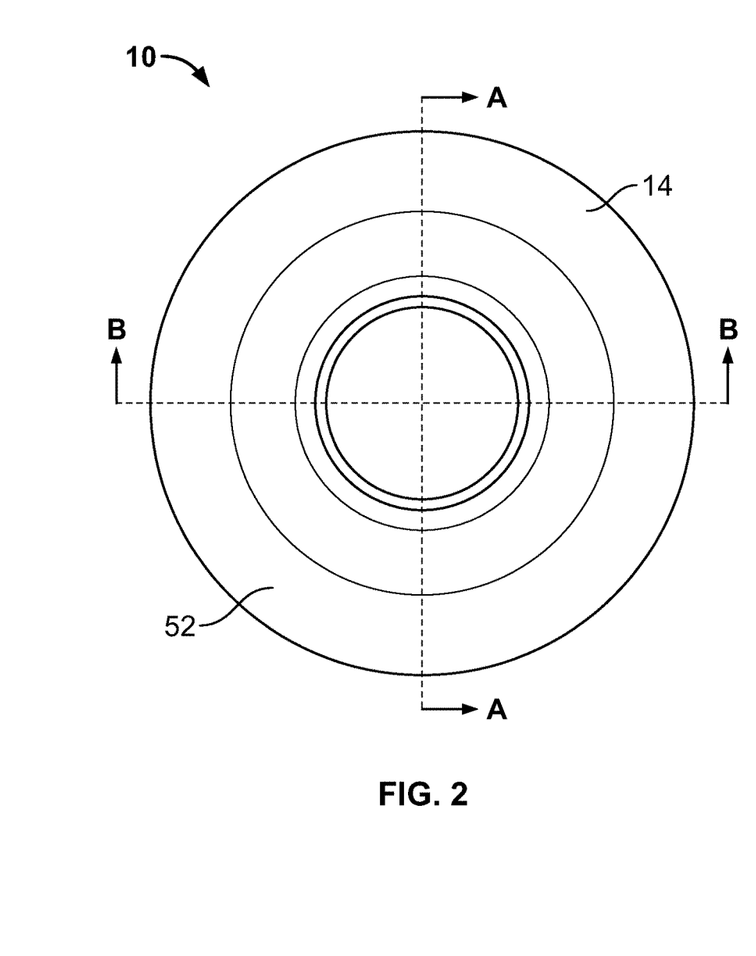
FIG. 2 is a top plan view of the liquid-tight strain relief shown in FIG. 1.
Figure 3:
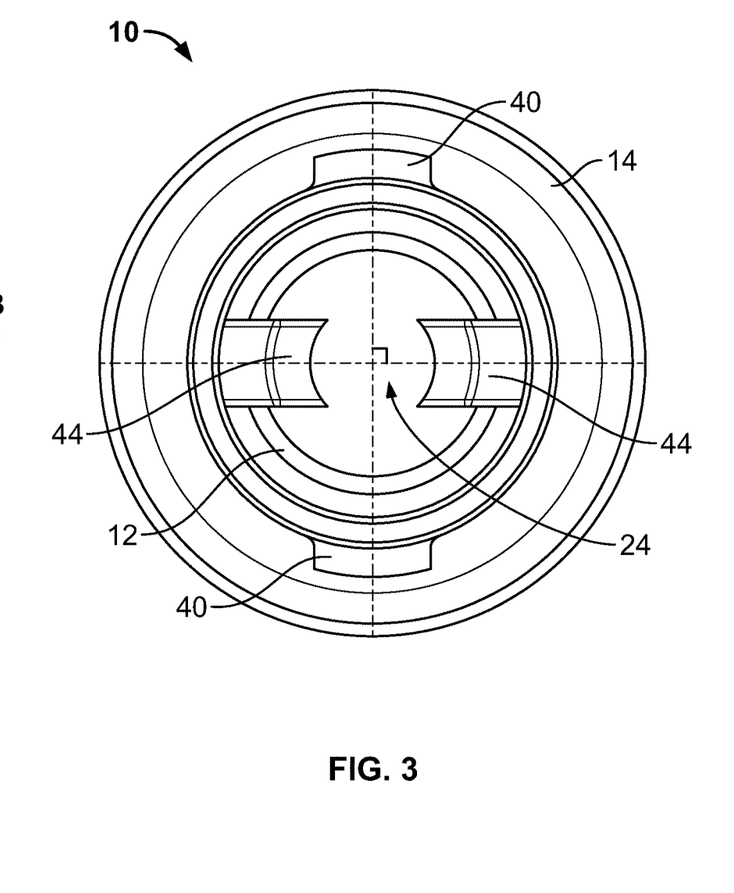
FIG. 3 is a bottom plan view of the liquid-tight strain relief shown in FIG. 1.
Figure 4:
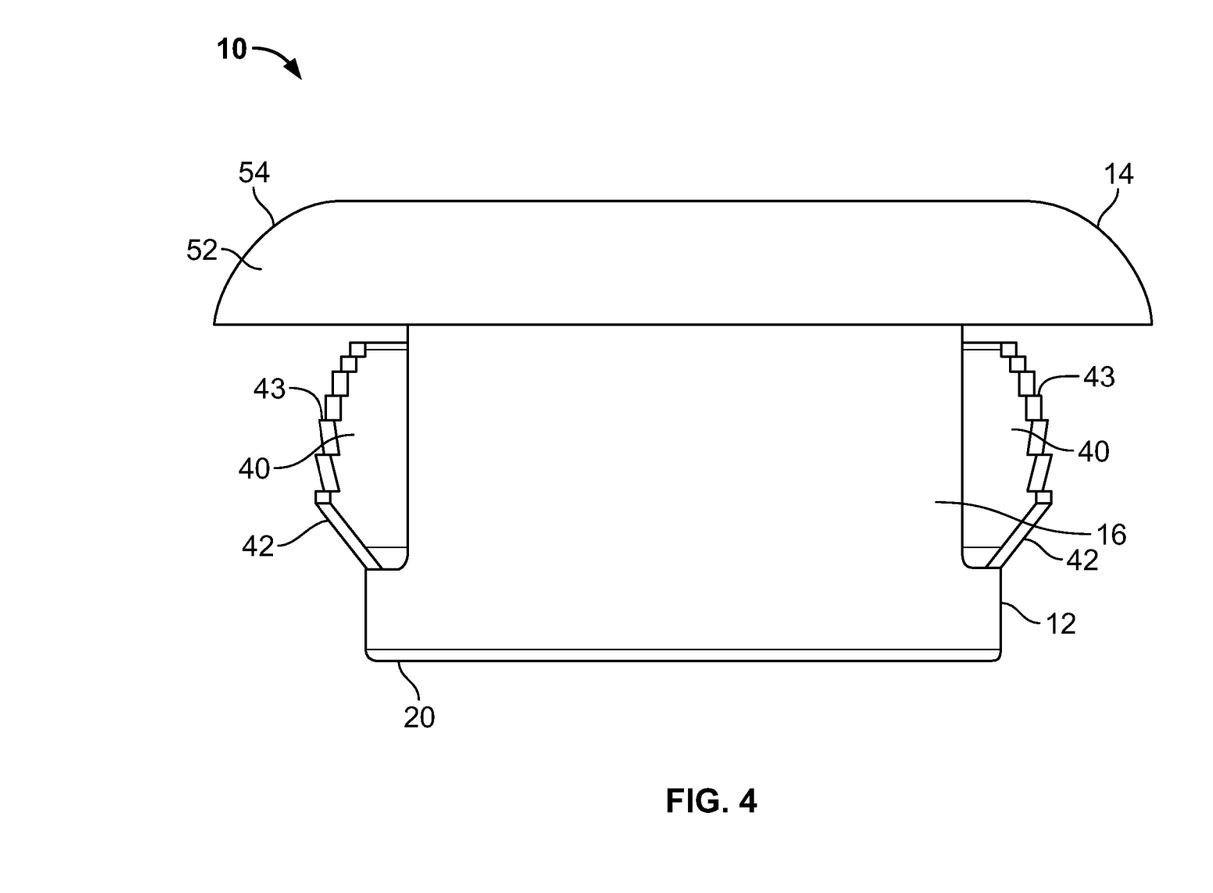
FIG. 4 is a side elevational view of the liquid-tight strain relief shown in FIG. 1.
Figure 5:
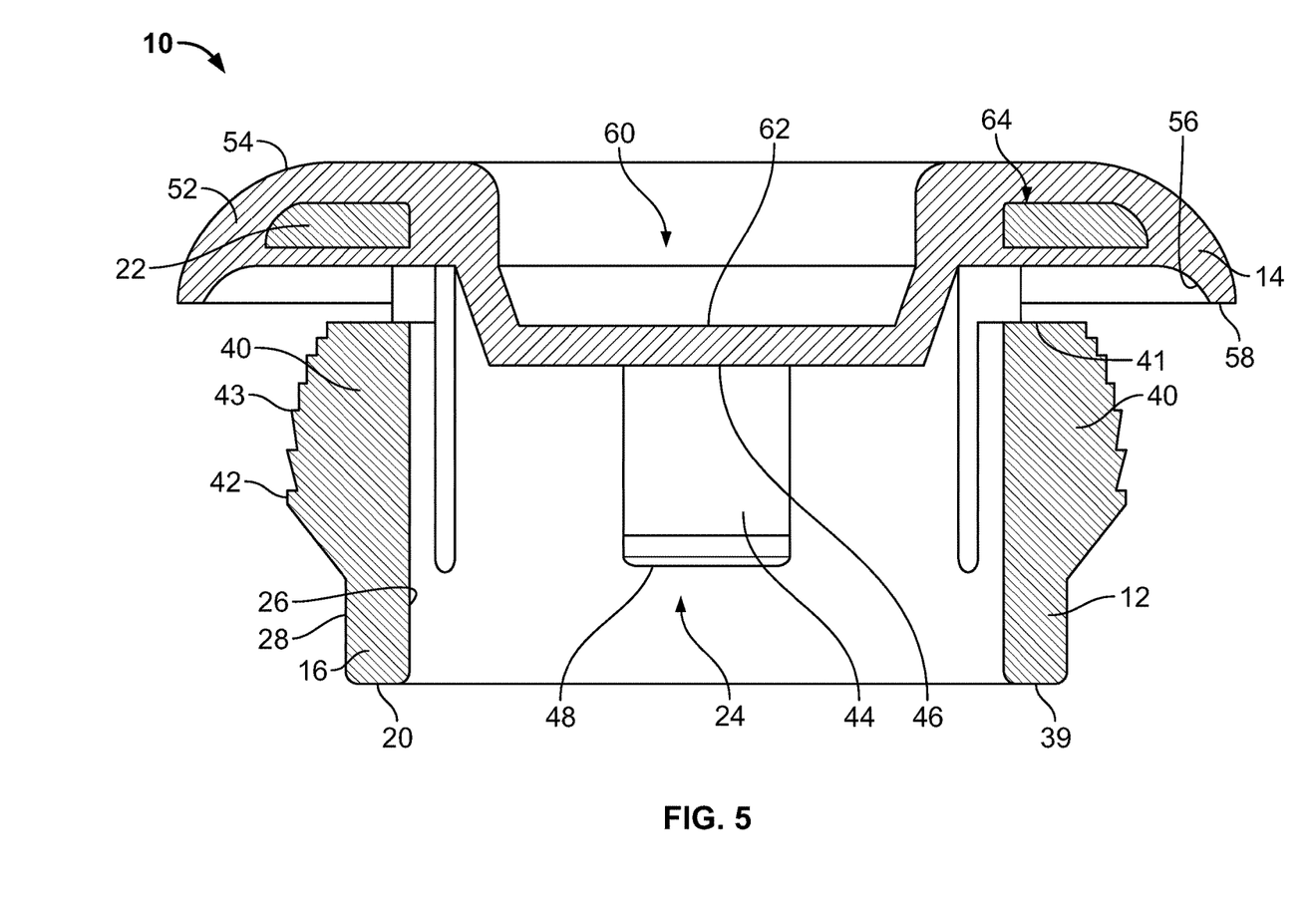
FIG. 5 is a side cross-sectional view, taken along lines A-A and looking in the direction of the arrows, of the liquid-tight strain relief shown in FIG. 2.
Figure 6:
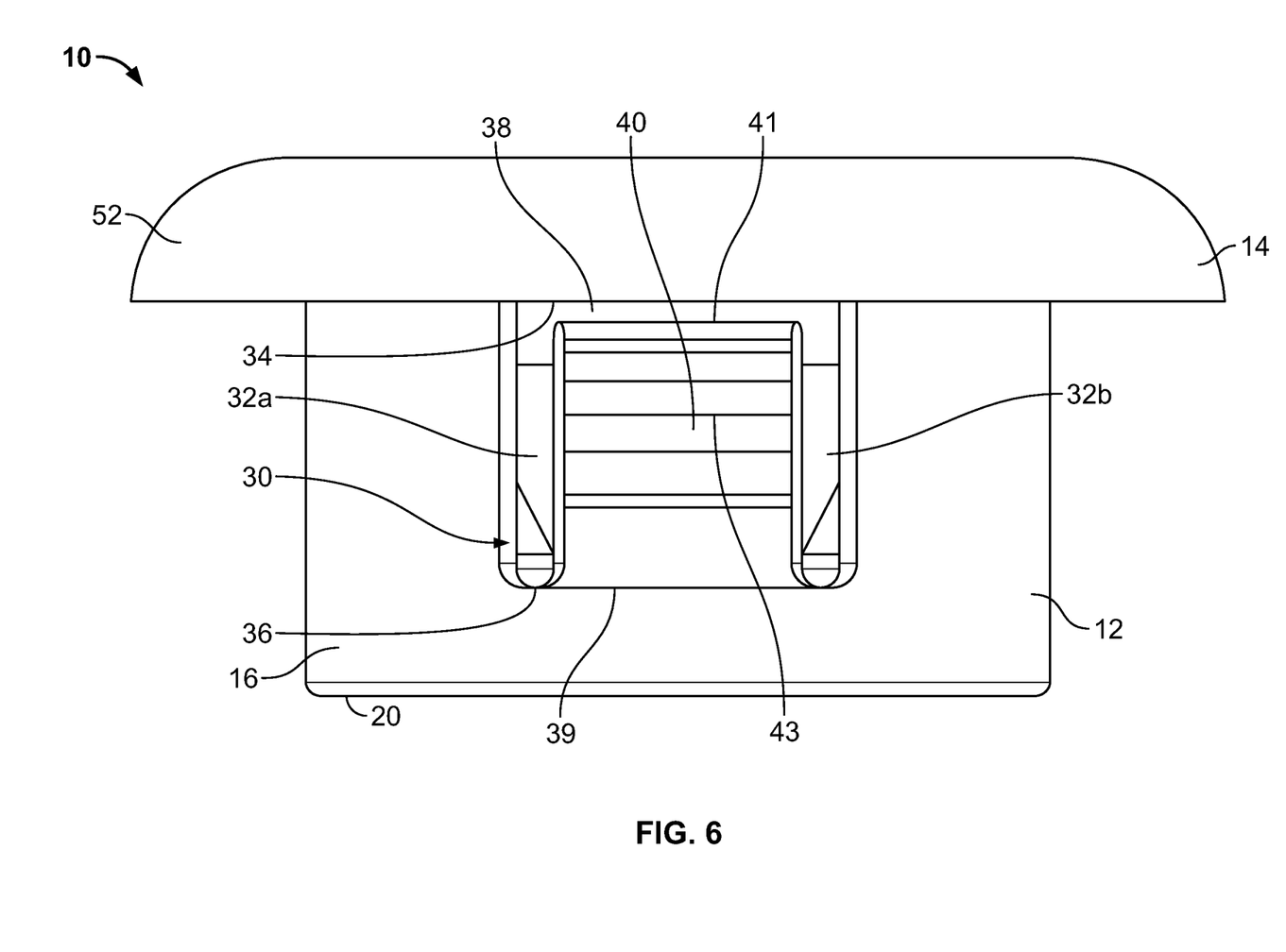
FIG. 6 is a side elevational view of the liquid-tight strain relief shown in FIG. 1.

With continued reference to FIGS. 1 through 7, in an embodiment, the bushing 12 includes a cylindrical-shaped housing 16 having a first end 18 and second end 20 opposite the first end 18, a peripheral flange 22 extending outwardly from the first end 18, and a centrally-located aperture 24 that extends from the first end 18 to the second end 20. The housing 16 of the bushing 12 further includes an inner wall 26, an outer wall 28, and a pair of diametrically opposed cutouts 30 extending from the inner wall 26 to the outer wall 28 (one of which is shown in FIG. 6). Each of the cutouts 30 includes a pair of spaced-apart and parallel, longitudinally extending slots 32a, 32b. Each of the slots 32a, 32b includes a first end 34 and second end 36 opposite the first end 34. The first ends 34 of each of the slots 32a, 32b are connected by a corresponding transverse slot 38. Each pair of the slots 32a, 32b and the corresponding transverse slot 38 define and surround a resilient outer finger 40. The outer finger 40 includes a first end 39 attached integrally to the housing 16, and an opposite free end 41. In an embodiment, the bushing 12 includes two of the outer fingers 40 that are diametrically opposed to one another. In other embodiments, the bushing 12 includes more or less than two of the outer fingers 40. Each of the outer fingers 40 includes an outer surface 42 having a plurality of elongated ribs 43 for frictional engagement with a work piece, which will be described hereinafter. In other embodiments, the outer surface 42 of the each of the outer fingers 40 may include other frictionally-engaging features known in the art.

Figure 7:
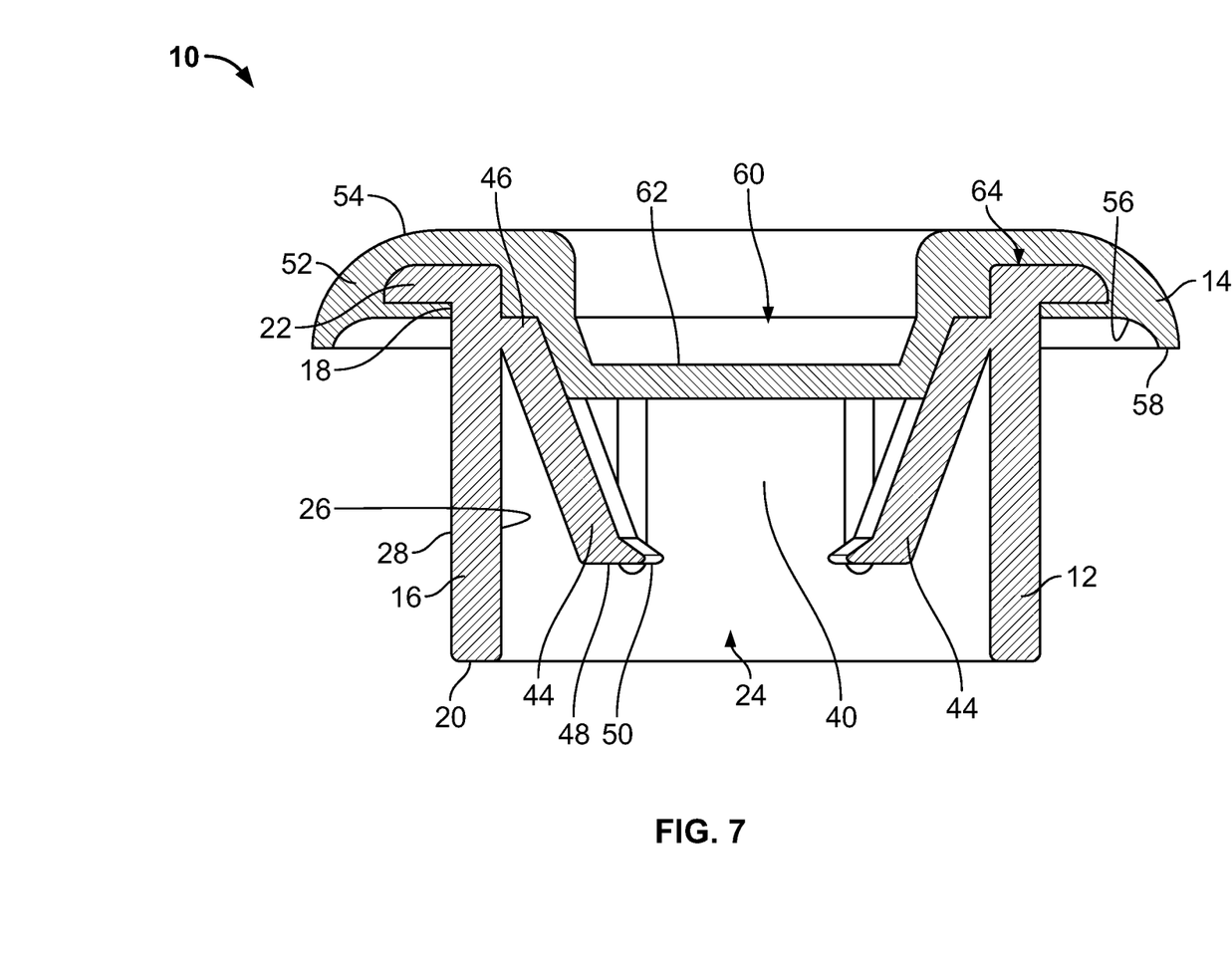
FIG. 7 is a side cross-sectional view, taken along lines B-B and looking in the direction of the arrows, of the liquid-tight strain relief shown in FIG. 2.
Figure 13:
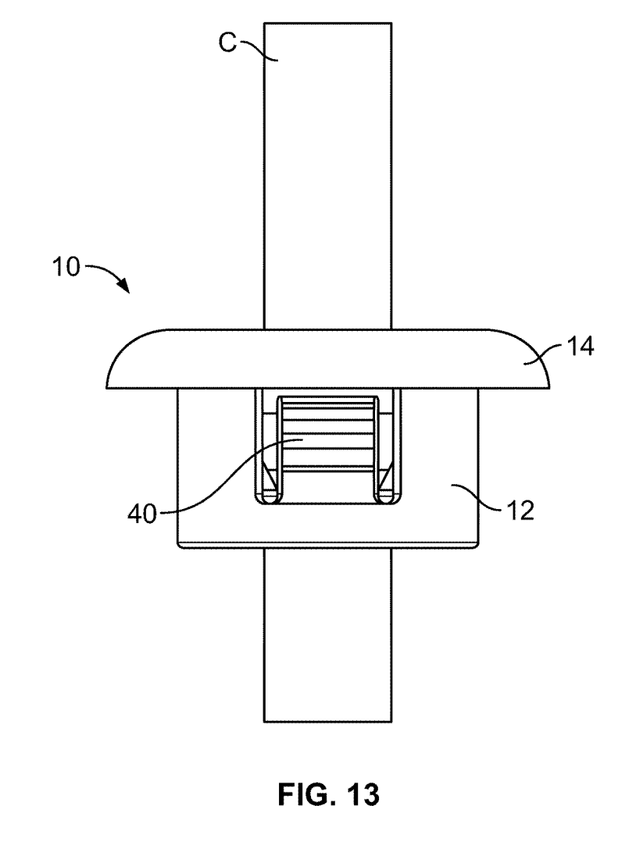
FIG. 13 is a side elevational view of the liquid-tight strain relief shown in FIG. 8.

Referring to FIGS. 5 and 7, in an embodiment, the bushing 12 includes a plurality of resilient inner fingers 44. Each of the inner fingers 44 includes a first end 46, which is attached to the inner wall 26 of the bushing 12 proximate to the first end 18 thereof, and a second, free end 48 opposite the first end 46, which is positioned within the aperture 24 of the bushing 12. In an embodiment, the first end 46 of each of the inner fingers 44 is integral with the inner wall 26. In an embodiment, each of the inner fingers 44 extends obliquely from the inner wall 26 of the bushing 12 within the aperture 24. In an embodiment, the second end 48 of each of the inner fingers 44 includes a pointed tip 50. It will be apparent to those of skill in the art that the plurality of resilient inner fingers 44 may include varying quantities of inner fingers 44. In an embodiment illustrated in FIG. 7, the bushing 12 includes two of the inner fingers 44 that are diametrically opposed to one another. In another embodiment, the bushing 12 includes three of the inner fingers 44. In another embodiment, the bushing 12 includes four of the inner fingers 44. In an embodiment illustrated in FIGS. 3, 13 and 14, the bushing 12 includes two of the inner fingers 44 that are diametrically opposed to one another and two of the outer fingers 40 that are diametrically opposed to one another, and a diameter defining the diametric opposition of the two inner fingers 44 is offset by a right angle from a diameter defining the diametric opposition of the two outer fingers 40.

Referring back to FIGS. 1 through 7, in an embodiment, the gland 14 includes a domed-shaped head 52 having a convex outer surface 54 and a concave inner surface 56, which meet to form an annular lip 58. A centrally-located, substantially circular-shaped depression 60 is formed within the outer surface 54 of the head 52, which culminates at a centrally-located membrane 62. In an embodiment, the membrane 62 includes a thickness that is sufficient for the membrane to be pierced, which will be described hereinafter. In an embodiment, the gland 14 is co-molded with the bushing 12 such that the flange 22 of the bushing 12 is encapsulated within an annular interior portion 64 of the head 52 of the gland 14. When the gland 14 is co-molded to the bushing 12, the membrane 62 resides within the aperture 24 of the bushing 12 proximate to the first end 18 of the bushing 12.

It will be known to those of skill in the art that when items are described as being "co-molded" to one another, reference is made to a fabrication process whereby items made of different materials are fabricated simultaneously within a single mold. For example, when the bushing 12 and the gland 14 of the exemplary liquid-tight strain relief 10 are described herein as being co-molded to one another, those of skill in the art will understand this description to mean that the bushing 12 and the gland 14 are made of different materials that are formed within the same mold at the same time. As discussed above, these materials may include a thermoplastic forming the bushing 12 and a thermoplastic elastomer (TPE) forming the gland 14.

In use, the liquid-tight strain relief 10 is sized and shaped to be affixed in a liquid-tight manner within an orifice of a work piece, such as a panel or other structure (not shown in the Figures). When the strain relief 10 is installed within the orifice in the work piece, the ribs 43 on the outer fingers 40 frictionally engage the work piece to facilitate the fixation of the strain relief 10 therein. In an embodiment, as the strain relief 10 is inserted into the orifice of the work piece, the ribs 43 are compressed to fit within the orifice. Once the strain relief 10 is secured within the orifice of the work piece, the annular lip 58 of the gland 14, which acts on the engaged surface of the work piece, forms a liquid-tight seal thereon.

Figure 8:
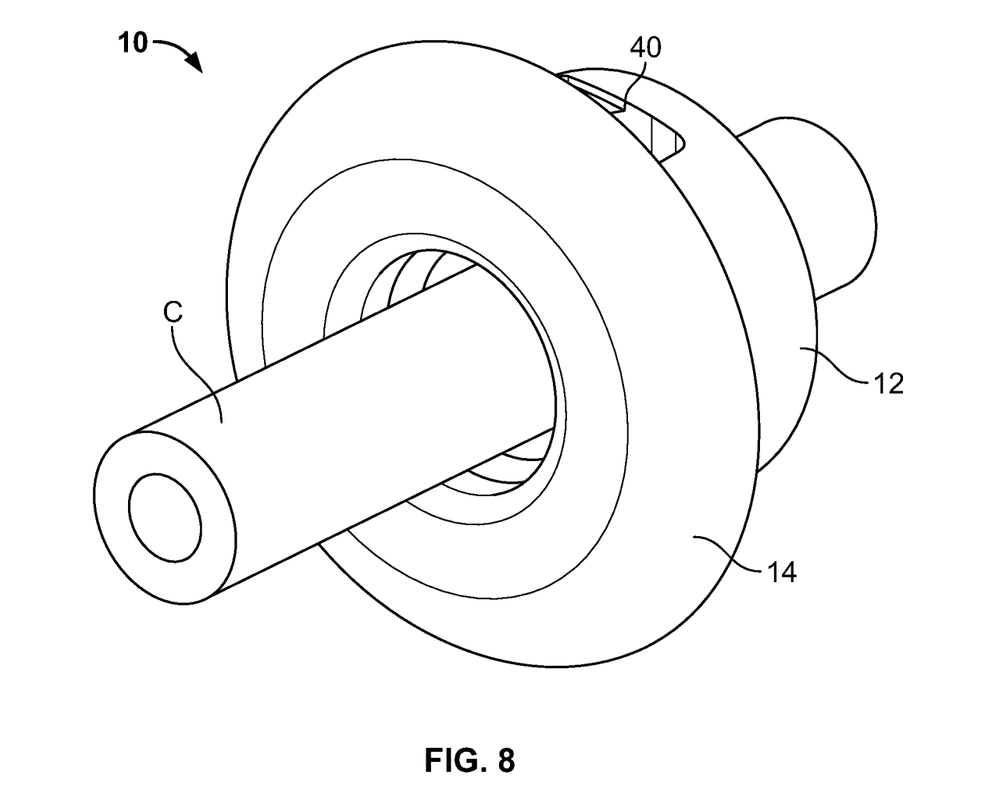
FIG. 8 is a top perspective view of the liquid-tight strain relief shown in FIG. 1 but with a cable positioned within it.
Figure 9:
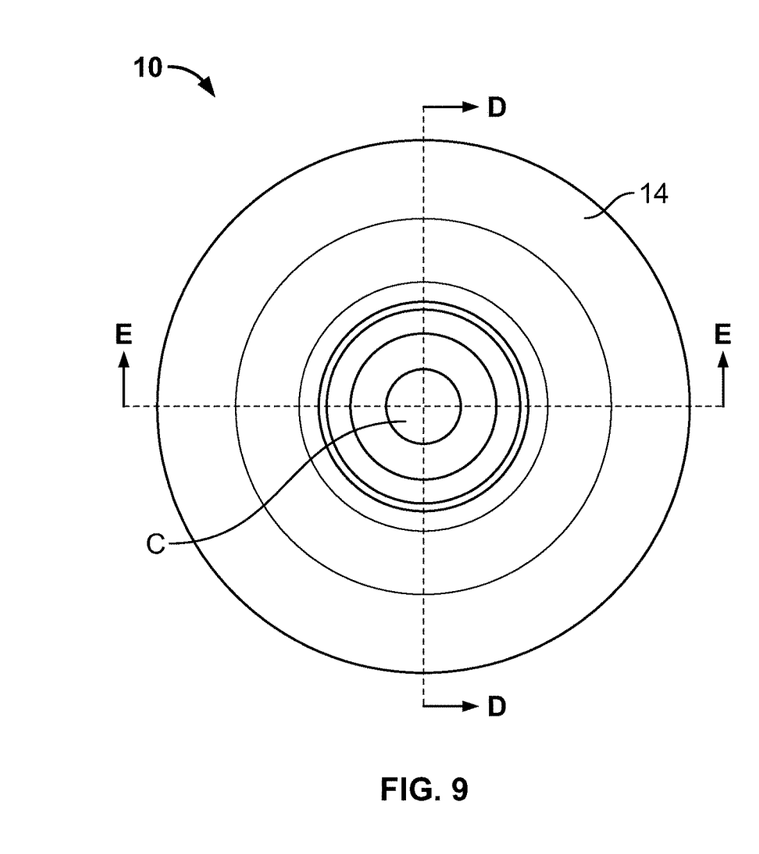
FIG. 9 is a top plan view of the liquid-tight strain relief shown in FIG. 8.
Figure 10:
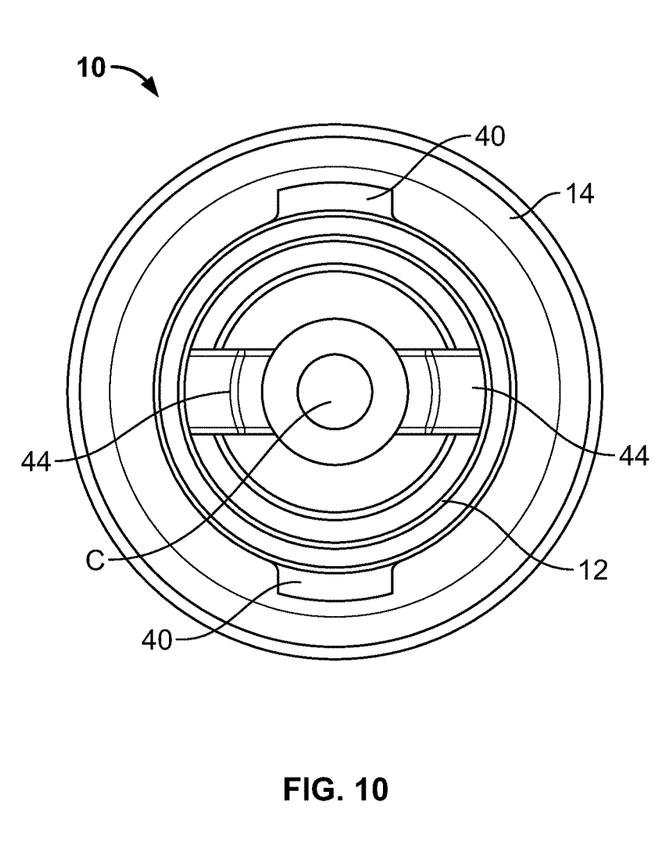
FIG. 10 is a bottom plan view of the liquid-tight strain relief shown in FIG. 8.
Figure 11:
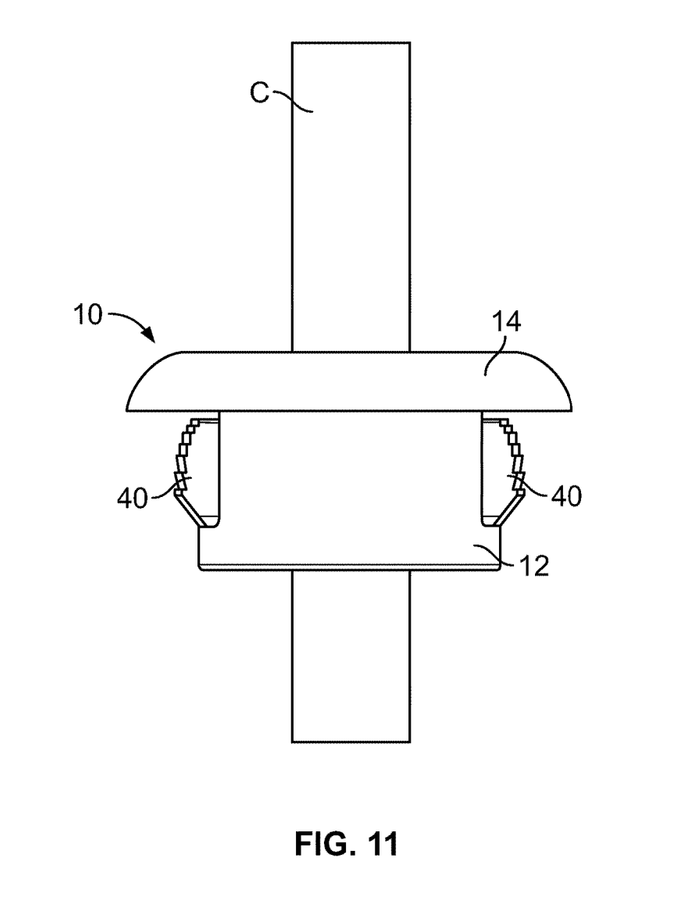
FIG. 11 is a side elevational view of the liquid-tight strain relief shown in FIG. 8.
Figure 12:
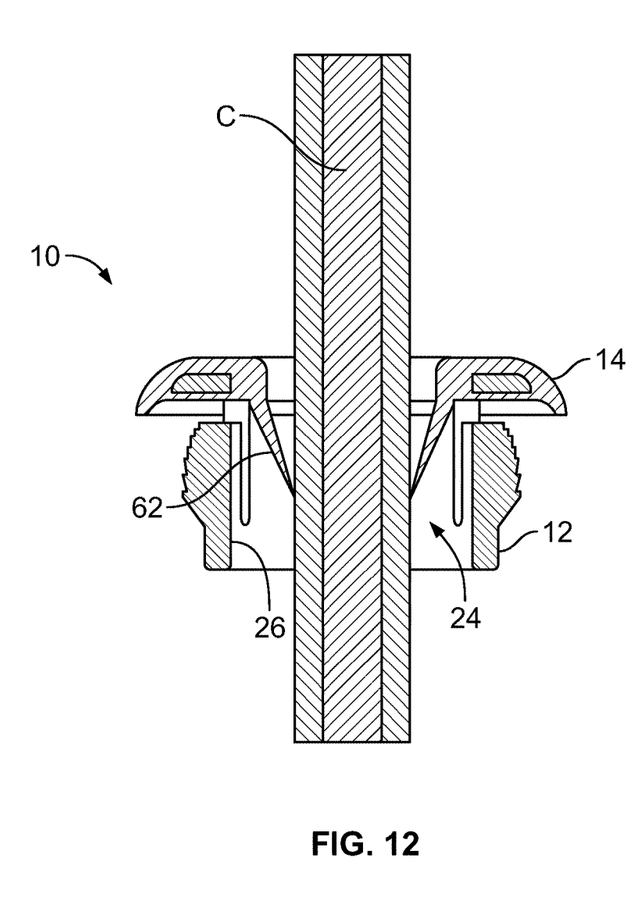
FIG. 12 is a side cross-sectional view, taken along lines D-D and looking in the direction of the arrows, of the liquid-tight strain relief shown in FIG. 9.
Figure 14:
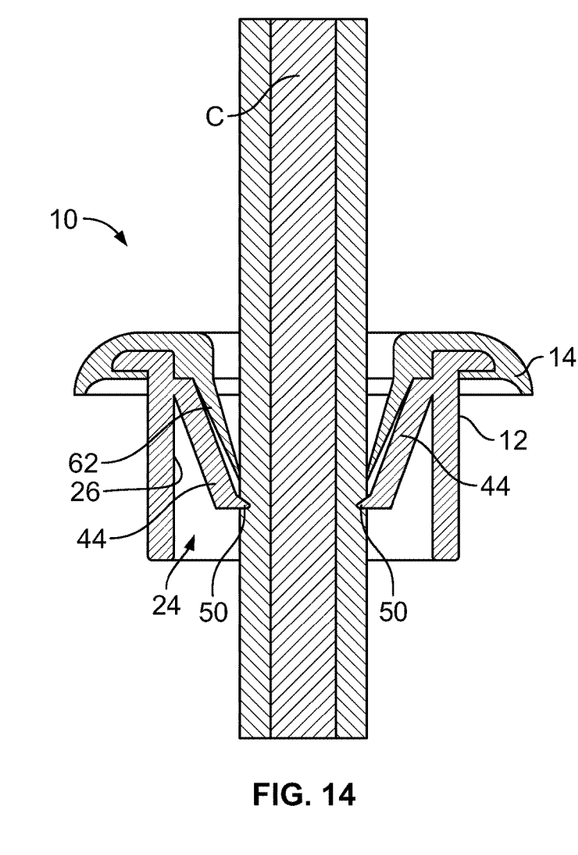
FIG. 14 is a side cross-sectional view, taken along lines E-E and looking in the direction of the arrows, of the liquid-tight strain relief shown in FIG. 9.

Referring to FIGS. 8 through 14, when a cable C (or a wire, tubing, rod and other elongated object) is inserted in the strain relief 10, it pierces the membrane 62 of the gland 14 (see FIGS. 8, 12 and 14). In this regard, the membrane 62 stretches and forms a liquid-tight seal around the cable C. In another embodiment, the cable C may first be installed through the strain relief 10, after which the strain relief 10 may be engaged in position along the cable C and then affixed within the orifice of the work piece. When the cable C is further inserted through the aperture 24 of the bushing 12, the cable C engages the inner fingers 44 which flex to allow the cable C to be inserted therethrough. As a result of the resiliency of the inner fingers 44, they are movable outwardly towards the inner wall 26 of the bushing 12 from a first, disengaged position to a second, engaged position, in which the pointed tips 50 of the inner fingers 44 dig-in and clasp the outer surface of the cable C to provide strain relief (see FIGS. 12 and 14).

It should be understood that the embodiments described herein are merely exemplary and that a person skilled in the art may make many variations and modifications without departing from the spirit and scope of the invention. Accordingly, all such variations and modifications are intended to be included within the scope of the embodiments described herein as defined in the appended claims.

What is claimed is:

1. A liquid-tight strain relief, comprising a bushing including a first end, a second end opposite said first end, an outer wall, an aperture extending from said first end to said second end and defining an inner wall, an annular flange extending radially outwardly from said first end, said at least one cutout extending from said outer wall to said inner wall, said at least one cutout defining at least one outer finger, said at least one outer finger including means for frictionally engaging an orifice of a work piece, and a plurality of resilient, elongated inner fingers, each of which includes a first end attached to said inner wall and a free, second end extending into said aperture;
   a gland including a head having an outer surface, an inner surface, an annular interior portion located within said inner surface and encapsulating said annular flange of the bushing; and
   wherein said gland includes a depression formed within said outer surface thereof and coaxial with said aperture of said bushing, said depression including a membrane that is adapted to be pierced by an external object.

2. The liquid-tight strain relief of claim 1, wherein said at least one cutout includes a plurality of cutouts that are diametrically opposed to one another, and wherein said at least one outer finger includes two diametrically opposed outer fingers each of which is defined by a corresponding one of said two diametrically opposed cutouts.

3. The liquid-tight strain relief of claim 2, wherein said plurality of inner fingers includes two inner fingers that are diametrically opposed to one another, and wherein a diameter of said diametrically opposed inner fingers is offset by a right angle from a diameter of said diametrically opposed outer fingers.

4. The liquid-tight strain relief of claim 1, wherein said bushing is made from a first material and said gland is made from a second material, said second material having a greater elasticity than said first material.

5. The liquid-tight strain relief of claim 4, wherein said first material is a thermoplastic material and said second material is a thermoplastic elastomer.

6. The liquid-tight strain relief of claim 1, wherein said second end of each of said inner fingers includes a pointed tip.

7. The liquid-tight strain relief of claim 1, wherein said frictionally engaging means of said at least one cutout includes a plurality of ribs.

8. The liquid-tight strain relief of claim 7, wherein said plurality of ribs is compressible so that the liquid-tight strain relief is adapted to be positioned within the orifice of the work piece.

9. The liquid-tight strain relief of claim 1, wherein said bushing and said gland are co-molded with one another.

10. The liquid-tight strain relief of claim 1, wherein said membrane is adapted to form a liquid-tight seal around the external object when said membrane is pierced by the external object.

11. The liquid-tight strain relief of claim 9, wherein said inner fingers are adapted to clasp the external object when said membrane is pierced by the external object.

12. A liquid-tight strain relief, comprising a bushing including a first end, a second end opposite said first end, an outer wall, an aperture extending from said first end to said second end and defining an inner wall, an annular flange extending radially outwardly from said first end, said at least one cutout extending from said outer wall to said inner wall, said at least one cutout defining at least one outer finger, said at least one outer finger including means for frictionally engaging an orifice of a work piece, and a plurality of resilient, elongated inner fingers, each of which includes a first end attached to said inner wall and a free, second end extending into said aperture;
  a gland including a head having an outer surface, an inner surface, an annular interior portion located within said inner surface and encapsulating said annular flange of the bushing;
  wherein said at least one cutout of said bushing includes a pair of parallel, longitudinal slots, each of which includes a first end located proximate to said first end of said bushing and a second end located proximate to said second end of said bushing, and a transverse slot extending from said first end of one of said longitudinal slots to said first end of the other of said longitudinal slots.

13. The liquid-tight strain relief of claim 12, wherein said at least one cutout includes a plurality of cutouts that are diametrically opposed to one another, and wherein said at least one outer finger includes two diametrically opposed outer fingers each of which is defined by a corresponding one of said two diametrically opposed cutouts.

14. The liquid-tight strain relief of claim 13, wherein said plurality of inner fingers includes two inner fingers that are diametrically opposed to one another, and wherein a diameter of said diametrically opposed inner fingers is offset by a right angle from a diameter of said diametrically opposed outer fingers.

15. The liquid-tight strain relief of claim 12, wherein said bushing is made from a first material and said gland is made from a second material, said second material having a greater elasticity than said first material.

16. The liquid-tight strain relief of claim 15, wherein said first material is a thermoplastic material and said second material is a thermoplastic elastomer.

17. The liquid-tight strain relief of claim 12, wherein said second end of each of said inner fingers includes a pointed tip.

18. The liquid-tight strain relief of claim 12, wherein said frictionally engaging means of said at least one cutout includes a plurality of ribs.

19. The liquid-tight strain relief of claim 18, wherein said plurality of ribs is compressible so that the liquid-tight strain relief is adapted to be positioned within the orifice of the work piece.

20. The liquid-tight strain relief of claim 12, wherein said bushing and said gland are co-molded with one another.

21. The liquid-tight strain relief of claim 12, wherein said membrane is adapted to form a liquid-tight seal around the external object when said membrane is pierced by the external object.

22. The liquid-tight strain relief of claim 21, wherein said inner fingers are adapted to clasp the external object when said membrane is pierced by the external object.

* * * * *